(12) United States Patent
Matsuura et al.

(10) Patent No.: US 10,749,204 B2
(45) Date of Patent: Aug. 18, 2020

(54) ELECTRIC POWER STORAGE DEVICE AND METHOD OF MANUFACTURING THE SAME

(71) Applicant: TOYOTA JIDOSHA KABUSHIKI KAISHA, Toyota-shi, Aichi-ken (JP)

(72) Inventors: Tomohiro Matsuura, Toyota (JP); Kiyomi Kozuki, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/785,936

(22) Filed: Oct. 17, 2017

(65) Prior Publication Data

US 2018/0131030 A1 May 10, 2018

(30) Foreign Application Priority Data

Nov. 7, 2016 (JP) .................. 2016-217370

(51) Int. Cl.
| | |
|---|---|
| *H01M 2/22* | (2006.01) |
| *H01M 10/04* | (2006.01) |
| *H01M 2/26* | (2006.01) |
| *H01M 2/06* | (2006.01) |
| *H01M 2/30* | (2006.01) |
| *H01M 10/0585* | (2010.01) |
| *H01M 10/052* | (2010.01) |
| *H01M 10/0587* | (2010.01) |

(52) U.S. Cl.
CPC ......... *H01M 10/0431* (2013.01); *H01M 2/06* (2013.01); *H01M 2/263* (2013.01); *H01M 2/266* (2013.01); *H01M 2/30* (2013.01); *H01M 10/0413* (2013.01); *H01M 10/052* (2013.01); *H01M 10/0585* (2013.01); *H01M 10/0587* (2013.01); *Y02T 10/7011* (2013.01)

(58) Field of Classification Search
CPC ......... H01M 10/0431; H01M 10/0585; H01M 10/0413; H01M 2/30; H01M 2/06; H01M 2/266; H01M 10/052; H01M 2/263; H01M 10/0587; Y02T 10/7011
See application file for complete search history.

(56) References Cited

U.S. PATENT DOCUMENTS

| | | | |
|---|---|---|---|
| 2010/0266894 A1 | 10/2010 | Byun et al. | |
| 2016/0164133 A1 | 6/2016 | Matsumoto et al. | |
| 2016/0233478 A1* | 8/2016 | Iwasaki | H01G 11/72 |
| 2016/0351345 A1 | 12/2016 | Majima et al. | |

FOREIGN PATENT DOCUMENTS

| | | |
|---|---|---|
| CN | 105612632 A | 5/2016 |
| DE | 10 2011 110 694 A1 | 2/2013 |
| JP | 09213298 A | 8/1997 |

(Continued)

*Primary Examiner* — Cynthia K Walls
(74) *Attorney, Agent, or Firm* — Sughrue Mion, PLLC

(57) ABSTRACT

An electric power storage device includes a case body with an opening, the opening formed at an upper portion of the case body; an electrode body housed in the case body; a tab portion; and a current collecting terminal. The tab portion protrudes from part of the electrode body toward the opening of the case body. The tab portion has a side surface not facing the electrode body. The current collecting terminal is welded to the side surface of the tab portion.

6 Claims, 14 Drawing Sheets

(56) References Cited

FOREIGN PATENT DOCUMENTS

| | | |
|---|---|---|
| JP | 2006-236790 A | 9/2006 |
| JP | 2010-257945 A | 11/2010 |
| JP | 2013161756 A | 8/2013 |
| JP | 2013-196959 A | 9/2013 |
| JP | 2015125904 A | 7/2015 |
| JP | 2016110892 A | 6/2016 |
| KR | 1020160106645 A | 9/2016 |
| KR | 10-2016-0117431 A | 10/2016 |
| WO | WO-2015046143 A1 * | 4/2015 ............ H01G 11/72 |
| WO | 2015/118404 A1 | 8/2015 |

* cited by examiner

FIG. 16

|  | BATTERY CAPACITY | NUMBER OF VOLTAGE FAILURES |
|---|---|---|
| EXAMPLE 1 | 35Ah | 0/30 |
| COMPARATIVE EXAMPLE 1 | 30Ah | 0/30 |
| COMPARATIVE EXAMPLE 2 | 31Ah | 7/30 |
| COMPARATIVE EXAMPLE 3 | 32Ah | 0/30 |

ELECTRIC POWER STORAGE DEVICE AND METHOD OF MANUFACTURING THE SAME

INCORPORATION BY REFERENCE

The disclosure of Japanese Patent Application No. 2016-217370 filed on Nov. 7, 2016 including the specification, drawings and abstract is incorporated herein by reference in its entirety.

BACKGROUND

1. Technical Field

The present disclosure relates to an electric power storage device and a method of manufacturing the same.

2. Description of Related Art

With respect to an electric power storage device, there is disclosed a configuration in which a plurality of tab portions respectively protruding from electrodes are foil-collected and electrically connected to a current collecting terminal (see, e.g., Japanese Patent Application Publication No. 2013-196959 (JP 2013-196959 A)).

SUMMARY

In the electric power storage device configured as described above, since the tab portions are configured to be foil-collected, each tab portion has a bent portion. Therefore, a space for disposing the bent portions is required in a case that houses the electrodes. Consequently, the space that does not contribute to the battery capacity exists in the case, so that the battery capacity decreases.

The present disclosure provides an electric power storage device that can suppress a decrease in battery capacity, and further provides a method of manufacturing an electric power storage device that can suppress a decrease in battery capacity.

According to one aspect of the present disclosure, there is provided an electric power storage device including a case body, an electrode body, a tab portion, and a current collecting terminal. An opening is formed at an upper portion of the case body. The electrode body is housed in the case body. The tab portion protrudes from part of the electrode body toward the opening. The tab portion has a side surface not facing the electrode body. The current collecting terminal is welded to the side surface, not facing the electrode body, of the tab portion.

According to the above-described electric power storage device, since the tab portion and the current collecting terminal are electrically connected to each other without foil-collecting the tab portion, a space for disposing in a case a bent portion for foil-collecting the tab portion is not required. Therefore, it is possible to decrease in the case a space that does not contribute to the battery capacity, so that it is possible to suppress a decrease in battery capacity.

In the above-described electric power storage device, the case body may have a side wall. The electrode body may have a side end portion facing the side wall. The tab portion may be disposed further away from the side wall than the side end portion is. With this configuration, since the current collecting terminal can be disposed between the side surface of the tab portion and the side end portion of the electrode body, it is possible to decrease in the case a space in which only the current collecting terminal is disposed and which does not contribute to the battery capacity.

In the above-described electric power storage device, a plurality of tab portions may be arranged at an interval in a thickness direction of the tab portion. Even with the configuration in which the plurality of tab portions are spaced apart from each other, the tab portions and the current collecting terminal can be electrically connected to each other by welding the current collecting terminal to the side surfaces of the tab portions.

In the above-described electric power storage device, adjacent two of the tab portions may be electrically connected to each other only via the current collecting terminal. Even if not employing a configuration in which adjacent two of the tab portions are brought into contact with each other, the tab portions and the current collecting terminal can be electrically connected to each other by welding the current collecting terminal to the side surfaces of the tab portions.

In the above-described electric power storage device, the electrode body may include a positive electrode and a negative electrode. The electrode body may have a stacked structure in which the positive electrode and the negative electrode are stacked together. With this configuration, it is possible to suppress a decrease in battery capacity in the electric power storage device including the electrode body that is formed by stacking the positive electrode and the negative electrode together.

In the above-described electric power storage device, the stacked structure may be configured such that a plurality of positive electrodes and a plurality of negative electrodes are alternately stacked. With this configuration, it is possible to suppress a decrease in battery capacity in the electric power storage device including the stacked electrode body that is formed by alternately stacking the plurality of positive electrodes and the plurality of negative electrodes.

In the above-described electric power storage device, the tab portions may include a plurality of positive electrode tabs each protruding from part of a corresponding one of the positive electrodes and a plurality of negative electrode tabs each protruding from part of a corresponding one of the negative electrodes. The plurality of positive electrode tabs may be arranged in a stacking direction of the positive electrodes and the negative electrodes. The plurality of negative electrode tabs may be arranged in the stacking direction of the positive electrodes and the negative electrodes. The current collecting terminal may include a positive electrode current collecting terminal welded to side surfaces of the plurality of positive electrode tabs and a negative electrode current collecting terminal welded to side surfaces of the plurality of negative electrode tabs. With this configuration, neither the positive electrode tabs nor the negative electrode tabs need to be foil-collected. Therefore, it is possible to decrease in the case a space that does not contribute to the battery capacity, so that it is possible to suppress a decrease in battery capacity.

In the above-described electric power storage device, the case body may have a first side wall and a second side wall facing each other. The side surfaces of the positive electrode tabs to which the positive electrode current collecting terminal is welded may face the first side wall. The side surfaces of the negative electrode tabs to which the negative electrode current collecting terminal is welded may face the second side wall. With this configuration, work to weld the current collecting terminals to the tab portions is facilitated.

According to one aspect of the present disclosure, there is provided a method of manufacturing an electric power storage device, including a step of preparing a material; a step of processing the material to form an electrode body and a tab portion; and a step of welding a current collecting terminal. The tab portion protrudes from part of the electrode body and has a side surface not facing the electrode body. The current collecting terminal is welded to the side surface, not facing the electrode body, of the tab portion.

According to the above-described electric power storage device manufacturing method, since the tab portion and the current collecting terminal are electrically connected to each other without foil-collecting the tab portion, a space for disposing in a case a bent portion for foil-collecting the tab portion is not required. Therefore, it is possible to decrease in the case a space that does not contribute to the battery capacity, so that it is possible to suppress a decrease in battery capacity.

In the above-described electric power storage device manufacturing method, in the step of welding, the electrode body may be held such that the tab portion protrudes horizontally from the electrode body. With this configuration, it is possible to provide the electric power storage device with high reliability excellent in welding quality.

According to the electric power storage device and the electric power storage device manufacturing method of the present disclosure, it is possible to suppress a decrease in battery capacity.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 16 is a table showing the evaluation results about the battery capacity and the number of voltage failures in Example and Comparative Examples.

DETAILED DESCRIPTION OF EMBODIMENTS

Hereinbelow, electric power storage devices and methods of manufacturing the electric power storage devices according to embodiments will be described with reference to the drawings. In the following embodiments, the same symbols will be assigned to the same or substantially the same configurations, thereby omitting duplicate description thereof.

First Embodiment

Figure 1:
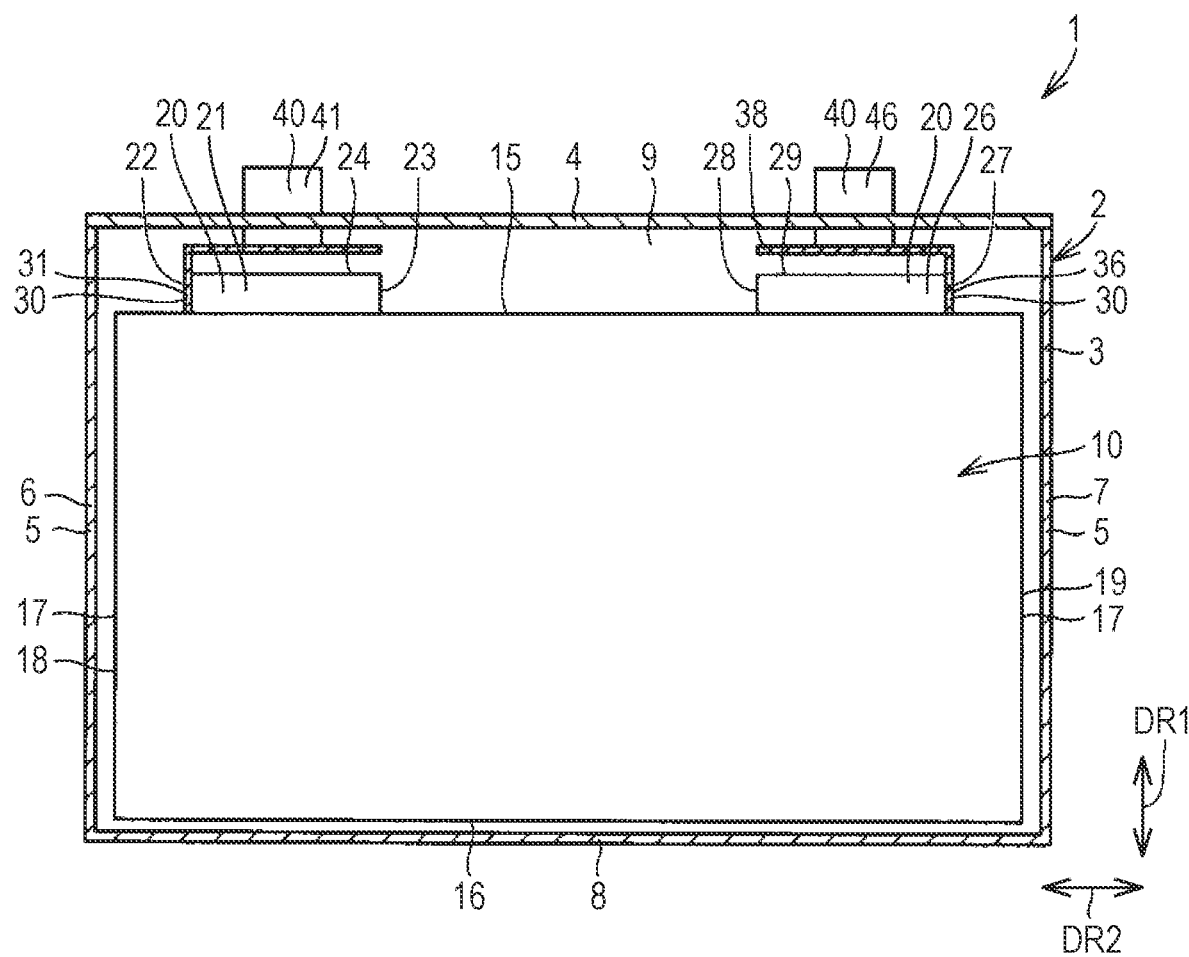
FIG. 1 is a longitudinal sectional view of an electric power storage device according to a first embodiment.

FIG. 1 is a longitudinal sectional view of an electric power storage device 1 according to a first embodiment. As shown in FIG. 1, the electric power storage device 1 includes a case 2. The case 2 has a flat generally rectangular parallelepiped shape and includes a case body 3 and a lid 4. The case body 3 has a bottomed rectangular box shape with an opening 9 and the opening 9 is formed at an upper portion of the case body 3.

The case body 3 has side walls 5. The side walls 5 include a first side wall 6 and a second side wall 7. The case body 3 has the first side wall 6 and the second side wall 7 facing each other. The first side wall 6 and the second side wall 7 have a vertically long rectangular shape and are arranged in parallel to each other.

The lid 4 is joined to upper ends of the side walls 5 such that the inside of the case 2 is sealed. The case body 3 has a bottom portion 8. The bottom portion 8 connects a lower end of the first side wall 6 and a lower end of the second side wall 7. The first side wall 6, the second side wall 7, and the bottom portion 8 are formed integrally with each other. The case body 3 and the lid 4 are made of a metal material such as an aluminum alloy or a steel material.

Figure 2:
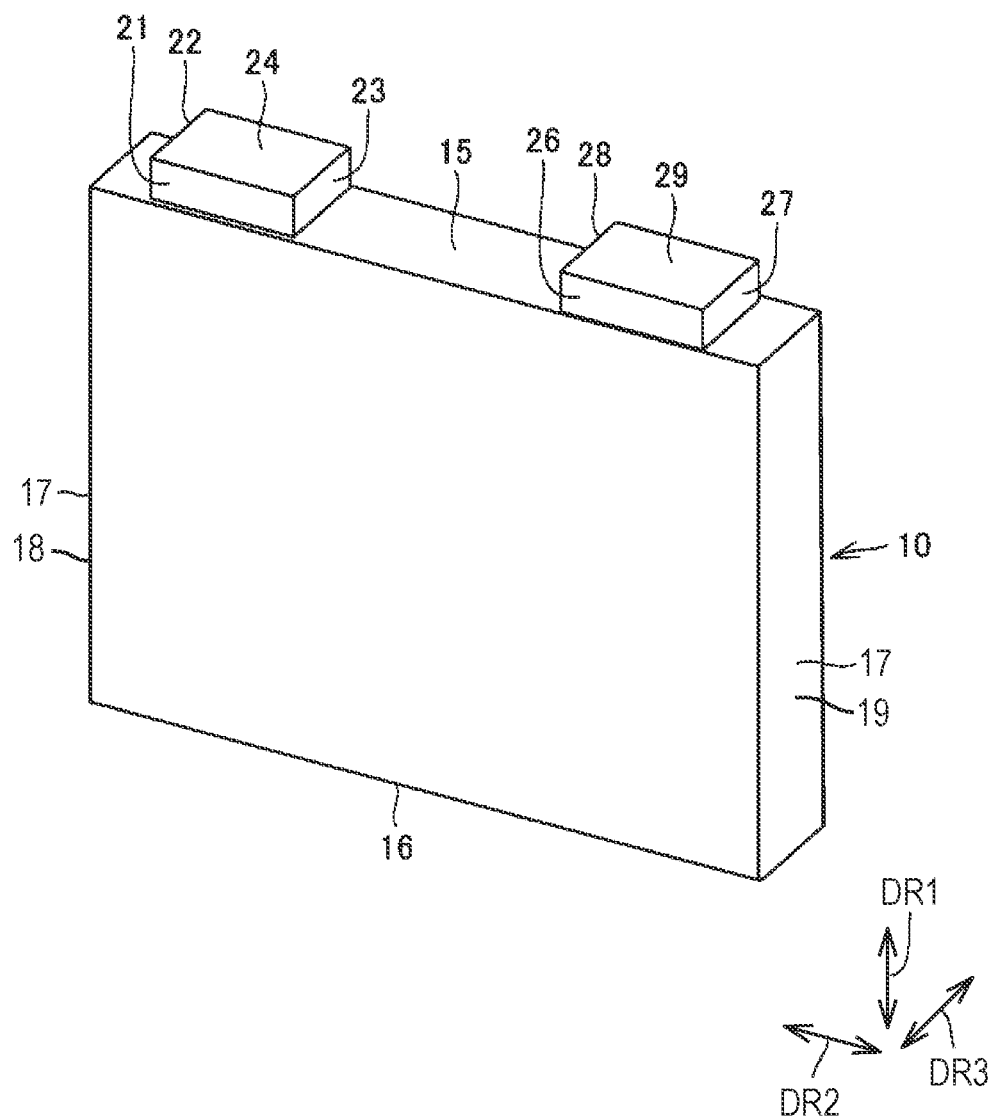
FIG. 2 is a perspective view of an electrode body and tab portions.

An electrode body 10 is housed in the case body 3. FIG. 2 is a perspective view of the electrode body 10 and tab portions 20. As shown in FIG. 2, the electrode body 10 has a flat generally rectangular parallelepiped shape on the whole and has an upper end portion 15, a lower end portion 16, and side end portions 17. The side end portions 17 include a first side end portion 18 and a second side end portion 19. As will be described later, the electrode body 10 is formed such that positive electrode plates and negative electrode plates each in the form of a flat plate are stacked with separators respectively interposed therebetween, while in FIG. 2 the external shape of the entire electrode body 10 is shown in a simplified manner.

Referring to FIG. 1, the upper end portion 15 of the electrode body 10 is disposed to face the lid 4 and to be spaced apart from the lid 4. The lower end portion 16 is disposed to face the bottom portion 8 and to be spaced apart from the bottom portion 8.

The side end portions 17 are disposed to face the side walls 5 and to be spaced apart from the side walls 5. The first side end portion 18 is disposed to face the first side wall 6 and to be spaced apart from the first side wall 6. The second side end portion 19 is disposed to face the second side wall 7 and to be spaced apart from the second side wall 7.

The tab portions 20 protrude from the upper end portion 15 of the electrode body 10. In the state shown in FIG. 1 where the electrode body 10 is housed in the case 2, the tab portions 20 protrude from parts of the electrode body 10 toward the opening 9 of the case body 3. The tab portions 20 include positive electrode tabs 21 and negative electrode tabs 26. Each positive electrode tab 21 has side surfaces 22 and 23 and a top surface 24. Each negative electrode tab 26 has side surfaces 27 and 28 and a top surface 29.

The side surfaces 22 and 23 of the positive electrode tabs 21 and the side surfaces 27 and 28 of the negative electrode tabs 26 are surfaces extending perpendicularly to the upper end portion 15 of the electrode body 10 and not facing the electrode body 10. The side surfaces 22 and 27 of the tab portions 20 face the side walls 5 of the case body 3. The side surfaces 22 of the positive electrode tabs 21 face the first side wall 6 of the case body 3. The side surfaces 27 of the negative electrode tabs 26 face the second side wall 7 of the case body 3. The top surfaces 24 of the positive electrode tabs 21 and the top surfaces 29 of the negative electrode tabs 26 extend in parallel to the upper end portion 15 of the electrode body 10 and face the lid 4.

Figure 3:
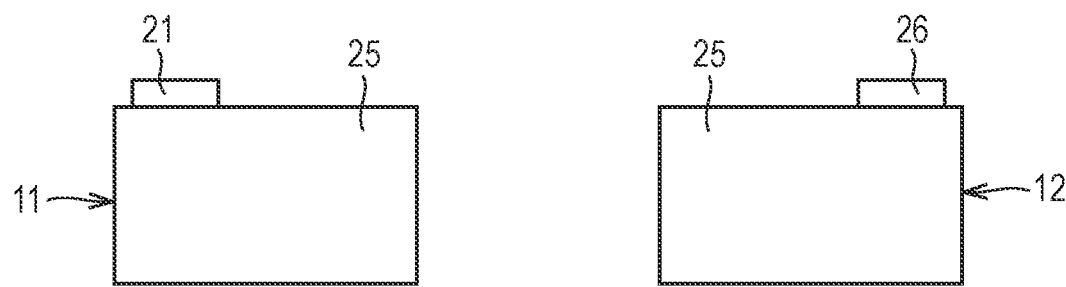
FIG. 3 is a front view of a positive electrode plate and a negative electrode plate.

FIG. 3 is a front view of one of positive electrode plates 11 and one of negative electrode plates 12 that form the electrode body 10. The electrode body 10 includes the positive electrode plates 11 and the negative electrode plates 12. FIG. 3 shows the single positive electrode plate 11 and the single negative electrode plate 12 before the positive electrode plates 11 and the negative electrode plates 12 are stacked together to form the electrode body 10.

The positive electrode plate 11 has a rectangular plate-like shape. The positive electrode plate 11 includes a base member and mixture layers 25 disposed on both surfaces of the base member. The base member of the positive electrode plate 11 may be an aluminum foil or an aluminum alloy foil. The mixture layer 25 contains a positive electrode active material. As the positive electrode active material, use can be made of, for example, a lithium-transition metal composite oxide such as $LiNiCoMnO_2$. The positive electrode tab 21 protrudes from part of a peripheral edge of the positive electrode plate 11. The positive electrode tab 21 is formed by extending a portion of the base member of the positive electrode plate 11. No mixture layer 25 is coated on the positive electrode tab 21.

The negative electrode plate 12 has a rectangular plate-like shape. The negative electrode plate 12 includes a base member and mixture layers 25 disposed on both surfaces of the base member. The base member of the negative electrode plate 12 may be a copper foil. The mixture layer 25 contains a negative electrode active material. As the negative electrode active material, use can be made of, for example, an amorphous coating natural graphite. The negative electrode tab 26 protrudes from part of a peripheral edge of the negative electrode plate 12. The negative electrode tab 26 is formed by extending a portion of the base member of the negative electrode plate 12. No mixture layer 25 is coated on the negative electrode tab 26.

Figure 4:
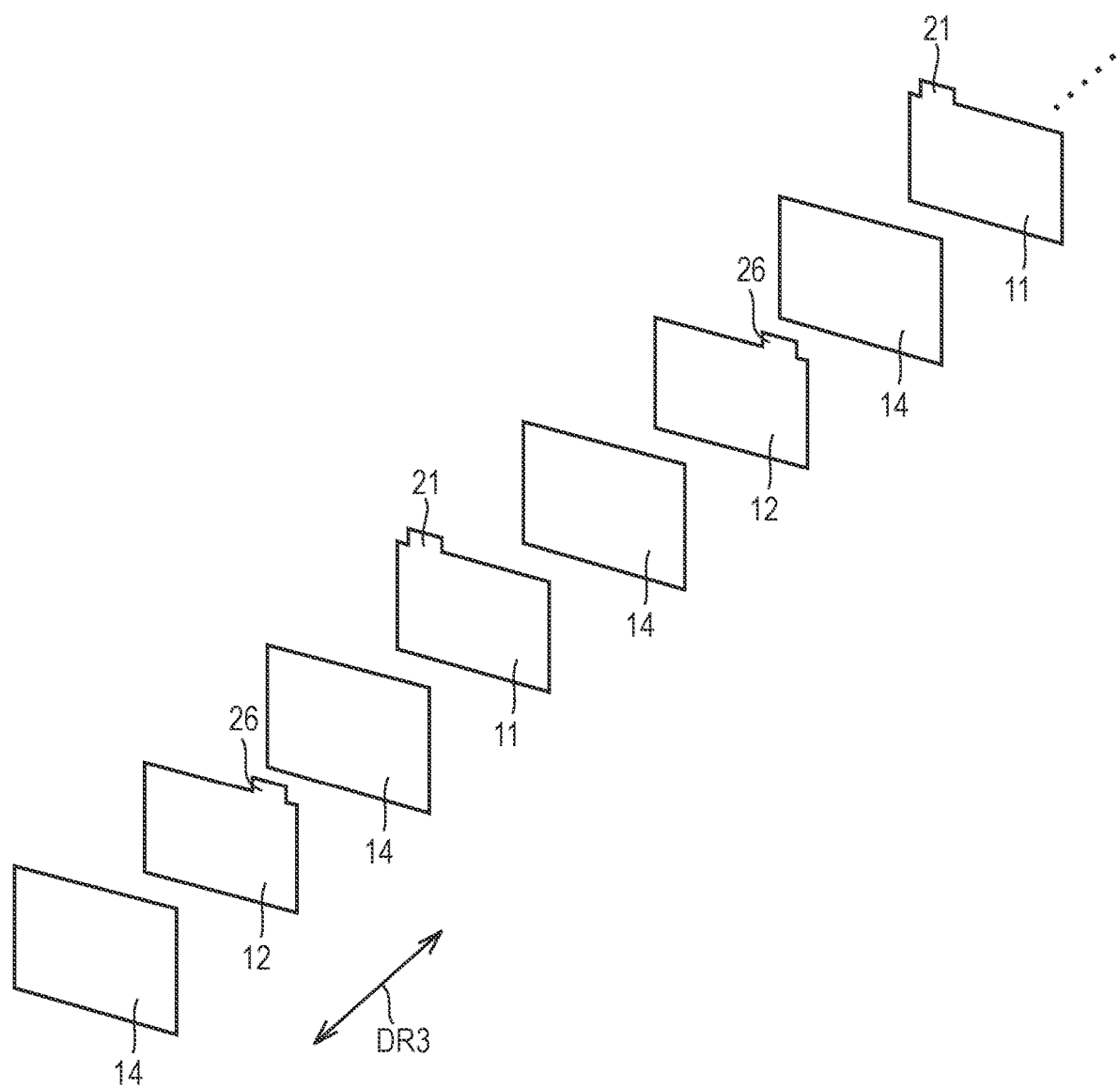
FIG. 4 is an exploded perspective view of the electrode body and the tab portions.

FIG. 4 is an exploded perspective view of the electrode body 10 and the tab portions 20. The electrode body 10 has a stacked structure in which the positive electrode plates 11 and the negative electrode plates 12 are stacked together. As shown in FIG. 4, the electrode body 10 further includes separators 14. Each separator 14 is interposed between a corresponding one of the positive electrode plates 11 and a corresponding one of the negative electrode plates 12. The positive electrode plates 11 and the negative electrode plates 12 are alternately stacked while being insulated from each other with the separators 14 respectively interposed therebetween, so that the stacked structure is formed.

The separators 14 prevent short circuits between the positive electrode plates 11 and the negative electrode plates 12. As the separator 14, use can be made of, for example, a polyethylene porous film. The separator 14 may be impregnated with an electrolyte solution in advance. A solvent of the electrolyte solution may be, for example, ethylene carbonate, dimethyl carbonate, or ethyl methyl carbonate. A supporting electrolyte of the electrolyte solution may be, for example, $LiPF_6$.

A direction indicated by a double-headed arrow DR3 in FIG. 4 is a stacking direction of the positive electrode plates 11 and the negative electrode plates 12 and will be referred to as a "stacking direction DR3". The stacking direction DR3 is a thickness direction of the positive electrode plate 11 and a thickness direction of the negative electrode plate 12. The stacking direction DR3 is a thickness direction of the positive electrode tab 21 and a thickness direction of the negative electrode tab 26. The stacking direction DR3 is a thickness direction of the tab portion 20.

The positive electrode tabs 21 are arranged in the stacking direction DR3. The separators 14 and the negative electrode plate 12 are interposed between the corresponding two positive electrode plates 11 adjacent to each other in the stacking direction DR3, so that the positive electrode tabs 21 are arranged at an interval in the stacking direction DR3. The negative electrode tabs 26 are arranged in the stacking direction DR3. The separators 14 and the positive electrode plate 11 are interposed between the corresponding two negative electrode plates 12 adjacent to each other in the stacking direction DR3, so that the negative electrode tabs 26 are arranged at an interval in the stacking direction DR3. The tab portions 20 are arranged at an interval in the stacking direction DR3.

A direction indicated by a double-headed arrow DR1 in FIGS. 1 and 2 is a direction in which the tab portions 20 protrude from the electrode body 10, more specifically, a direction in which the positive electrode tabs 21 protrude from the positive electrode plates 11 and in which the negative electrode tabs 26 protrude from the negative electrode plates 12. This direction will be referred to as a "protruding direction DR1". A direction indicated by a double-headed arrow DR2 in FIGS. 1 and 2 is a direction perpendicular to the protruding direction DR1 and to the stacking direction DR3 and will be referred to as a "width direction DR2".

As shown in FIGS. 1 and 2, the upper end portion 15 of the electrode body 10 extends in the width direction DR2 and in the stacking direction DR3. The tab portions 20 protrude in the protruding direction DR1 from the upper end portion 15 and protrude upward of the separators 14. The positive electrode tabs 21 and the negative electrode tabs 26 forming the tab portions 20 are arranged in the width direction DR2. The side surfaces 23 of the positive electrode tabs 21 and the side surfaces 28 of the negative electrode tabs 26 face each other. The side surfaces 22 of the positive electrode tabs 21 are disposed further away from the negative electrode tabs 26 than the side surfaces 23 are. The side surfaces 27 of the negative electrode tabs 26 are disposed further away from the positive electrode tabs 21 than the side surfaces 28 are.

As shown in FIG. 1, the tab portions 20 are disposed further away from the side walls 5 of the case body 3 than the side end portions 17 of the electrode body 10 are. The positive electrode tabs 21 are disposed further away from the first side wall 6 of the case body 3 than the first side end portion 18 of the electrode body 10 is. The negative electrode tabs 26 are disposed further away from the second side wall 7 of the case body 3 than the second side end portion 19 of the electrode body 10 is.

Figure 5:
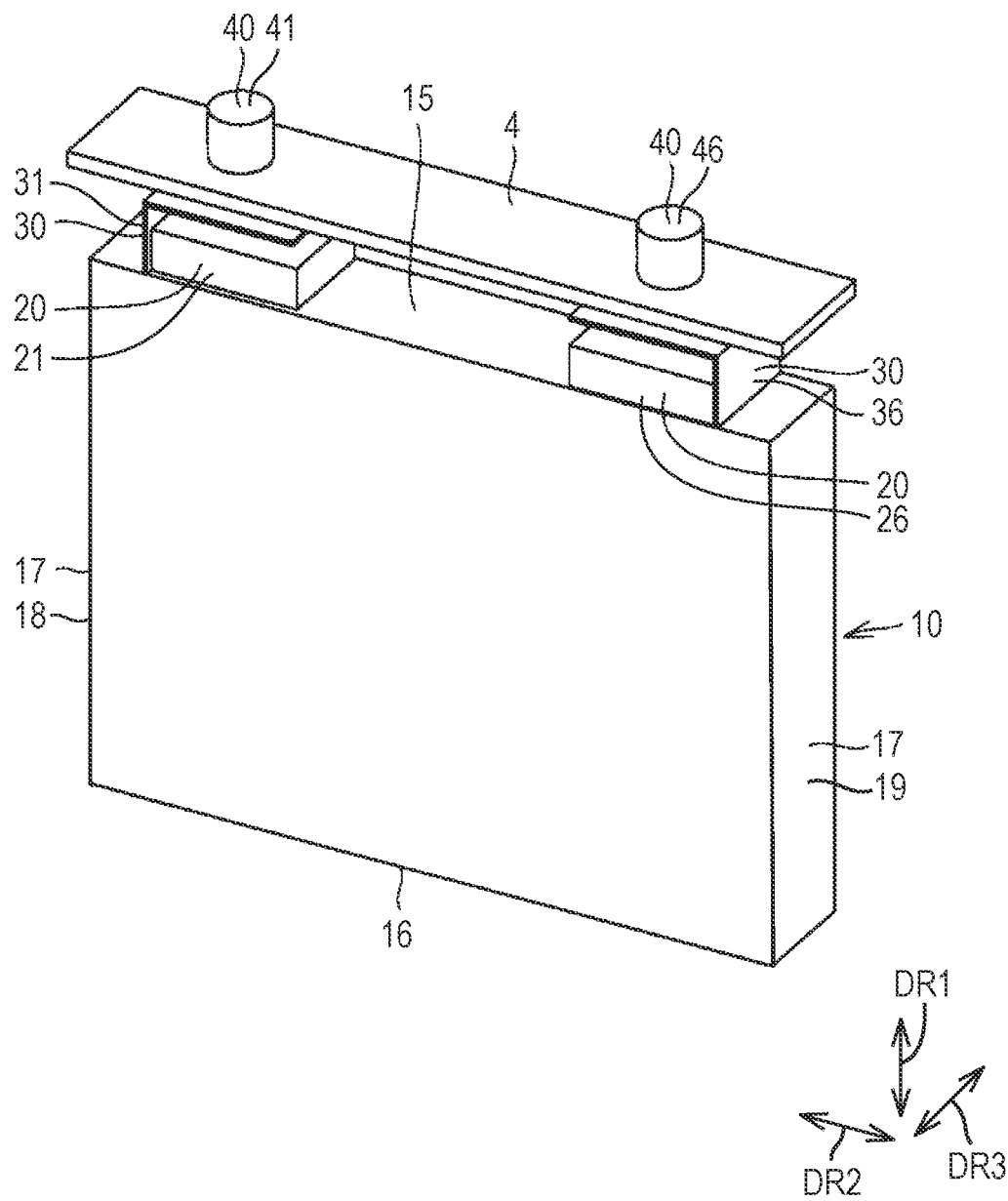
FIG. 5 is a perspective view of a state in which current collecting terminals are fixed to the tab portions and further a lid is attached.
Figure 6:
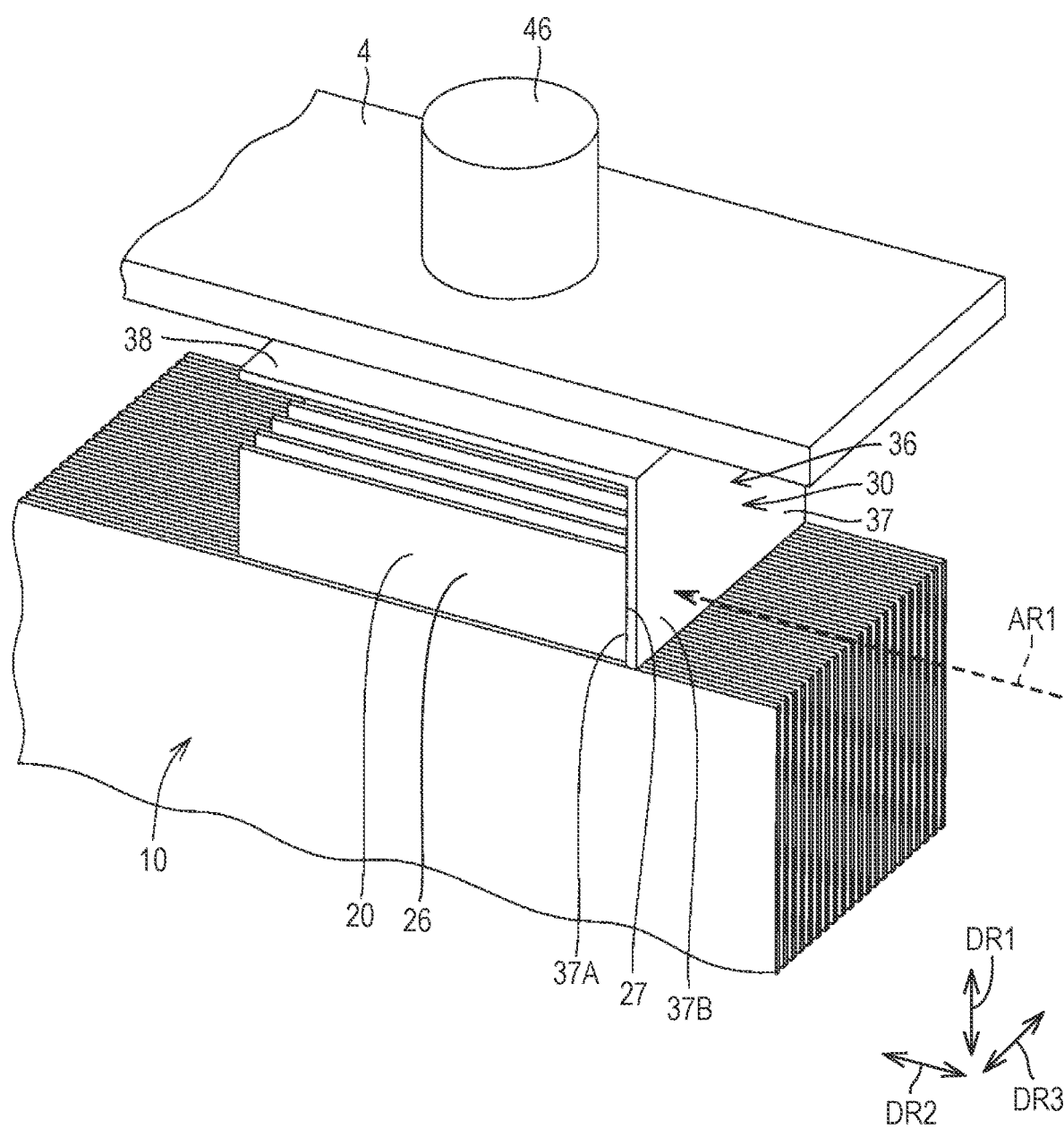
FIG. 6 is a perspective view showing, on an enlarged scale, a portion around negative electrode tabs shown in FIG. 5.

FIG. 5 is a perspective view of a state in which current collecting terminals 30 are fixed to the tab portions 20 and further the lid 4 is attached. FIG. 6 is a perspective view showing, on an enlarged scale, a portion around the negative electrode tabs 26 shown in FIG. 5. In FIG. 5, as in FIG. 2, the external shape of the entire electrode body 10 is shown in a simplified manner.

Referring also to FIG. 1, the lid 4 has a flat-plate shape. The lid 4 as viewed in the protruding direction DR1 has a rectangular shape. A thickness direction of the lid 4 is the protruding direction DR1. The lid 4 is formed with two through-holes passing through the lid 4 in the thickness direction. External terminals 40 are respectively disposed through the through-holes. An insulating member (not shown) is interposed between each external terminal 40 and the lid 4, so that the external terminals 40 and the lid 4 are electrically insulated from each other. The external terminals 40 include a positive electrode terminal 41 that is electrically connected to the positive electrode tabs 21, and a negative electrode terminal 46 that is electrically connected to the negative electrode tabs 26.

As shown in FIGS. 5 and 6, each current collecting terminal 30 is welded to the side surfaces of the tab portions 20. Each current collecting terminal 30 is fixed to the side surfaces of the tab portions 20 with welded portions interposed therebetween. The current collecting terminals 30 include a positive electrode current collecting terminal 31 and a negative electrode current collecting terminal 36.

The positive electrode current collecting terminal 31 is welded to the side surfaces 22 of the positive electrode tabs 21. The positive electrode current collecting terminal 31 is fixed to the side surfaces 22 of the positive electrode tabs 21 by welding. The positive electrode current collecting terminal 31 is fixed to the side surfaces 22 of the positive electrode tabs 21 with welded portions interposed therebetween. The negative electrode current collecting terminal 36 is welded to the side surfaces 27 of the negative electrode tabs 26. The negative electrode current collecting terminal 36 is fixed to the side surfaces 27 of the negative electrode tabs 26 by welding. The negative electrode current collecting terminal 36 is fixed to the side surfaces 27 of the negative electrode tabs 26 with welded portions interposed therebetween.

The negative electrode current collecting terminal 36 has a current collecting connection portion 37 and a terminal connection portion 38. The current collecting connection portion 37 extends in the protruding direction DR1, while the terminal connection portion 38 extends in the width direction DR2. The negative electrode current collecting terminal 36 has a generally L-shape in which the current collecting connection portion 37 and the terminal connection portion 38 perpendicular to each other are connected together at their edge portions.

The current collecting connection portion 37 is welded to the side surfaces 27 of the negative electrode tabs 26 so as to be fixed thereto. The current collecting connection portion 37 has a first surface 37A facing the negative electrode tabs 26 and a second surface 37B on the opposite side of the first surface 37A. For example, laser welding is used for fixing the current collecting connection portion 37 to the side surfaces 27 of the negative electrode tabs 26. An irradiation direction AR1 indicated by a broken line arrow in FIG. 6 is a direction in which a laser beam is irradiated to the current collecting connection portion 37.

In the state where the first surface 37A of the current collecting connection portion 37 is disposed in contact with the side surfaces 27 of the negative electrode tabs 26, a high-energy beam such as a laser beam is irradiated to the second surface 37B. Consequently, a portion, located at a position opposite to an irradiation position of the high-energy beam, of the first surface 37A is locally melted and solidified. In this way, the first surface 37A of the current collecting connection portion 37 and the side surfaces 27 of the negative electrode tabs 26 are joined together such that the negative electrode current collecting terminal 36 and the negative electrode tabs 26 are welded together with welded portions formed between the first surface 37A and the side surfaces 27.

By the welding of the negative electrode current collecting terminal 36 to the negative electrode tabs 26, the negative electrode tabs 26 are electrically connected to each other. As described above, since the negative electrode tabs 26 are arranged at an interval in the stacking direction DR3, adjacent two of the negative electrode tabs 26 are electrically connected to each other only via the negative electrode current collecting terminal 36.

Referring also to FIG. 1, the negative electrode terminal 46 is mounted on the terminal connection portion 38. The terminal connection portion 38 is electrically connected to the negative electrode terminal 46. The negative electrode terminal 46 is electrically connected to the negative electrode tabs 26 via the negative electrode current collecting terminal 36 and is electrically connected to the negative electrode plates 12 via the negative electrode current collecting terminal 36 and the negative electrode tabs 26.

The positive electrode current collecting terminal 31 has a shape mirror-symmetrical to the negative electrode current collecting terminal 36. In the same way as the negative electrode current collecting terminal 36 is disposed with respect to the negative electrode tabs 26, the positive electrode current collecting terminal 31 is disposed with respect to the positive electrode tabs 21. Like the negative electrode current collecting terminal 36, the positive electrode current collecting terminal 31 is welded to the side surfaces 22 of the positive electrode tabs 21. Adjacent two of the positive electrode tabs 21 are electrically connected to each other only via the positive electrode current collecting terminal 31.

Figure 7:
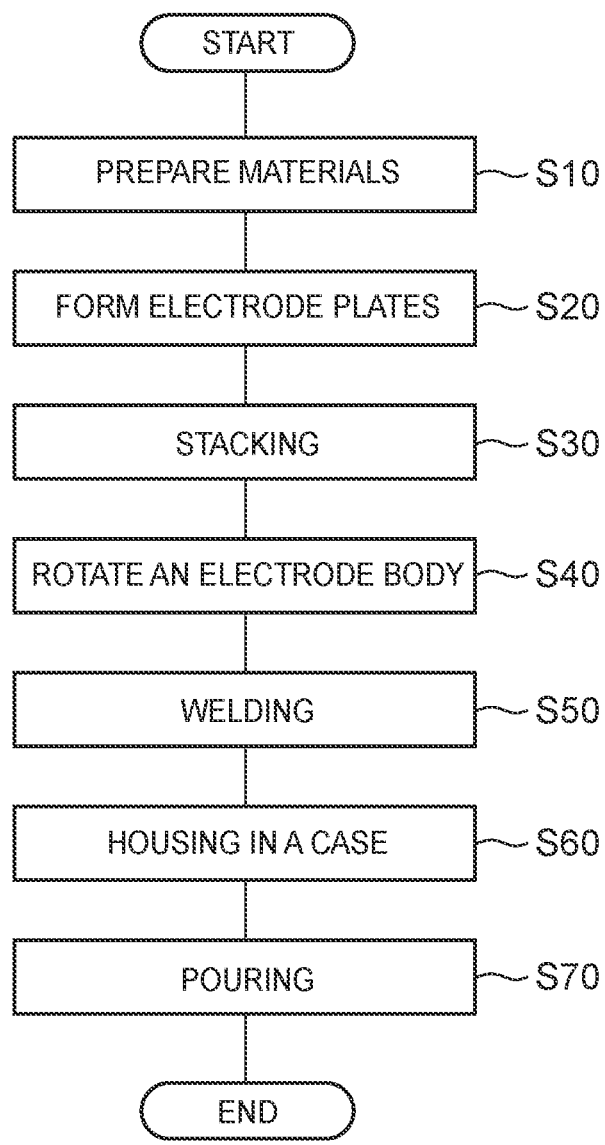
FIG. 7 is a flowchart showing an outline of a method of manufacturing the electric power storage device.

Next, a method of manufacturing the electric power storage device 1 according to the first embodiment will be described. FIG. 7 is a flowchart showing an outline of the method of manufacturing the electric power storage device 1.

As shown in FIG. 7, first, at step S10, the materials are prepared. Specifically, the aluminum foils or the aluminum alloy foils that will serve as the base members of the positive electrode plates 11, and the copper foils that will serve as the base members of the negative electrode plates 12, are prepared.

Then, at step S20, the materials are processed to form the electrode plates. Specifically, the mixture layers 25 are formed on the surfaces of the materials prepared at step S10. Subsequently, the materials are cut. The materials are cut into a shape such that a portion near an end of one long side of a rectangle protrudes in a short-side direction. A laser processing apparatus is preferably used for cutting the materials, but another arbitrary known cutter suitable for cutting a flat-plate material may alternatively be used. By cutting the materials into a predetermined size, the positive electrode plates 11 and the positive electrode tabs 21 are formed integrally with each other, and the negative electrode plates 12 and the negative electrode tabs 26 are formed integrally with each other.

Then, at step S30, the positive electrode plates 11 and the negative electrode plates 12 are stacked together. Specifically, as described above with reference to FIG. 4, the positive electrode plates 11 and the negative electrode plates 12 are alternately stacked with the separators 14 respectively interposed therebetween. The positive electrode plates 11, the negative electrode plates 12, and the separators 14 are disposed such that the positive electrode tabs 21 of the positive electrode plates 11 protrude from the edges of the separators 14 and that the negative electrode tabs 26 of the negative electrode plates 12 protrude from the edges of the separators 14. In this way, the electrode body 10 of the flat generally rectangular parallelepiped shape is obtained.

Then, at step S40, the electrode body 10 is rotated by 90 degrees such that the electrode body 10 is disposed with either one of its side end portions 17 of the electrode body 10 facing upward. In the state where the electrode body 10 is held in this way, the tab portions 20 protrude horizontally from the electrode body 10. The positive electrode tabs 21 and the negative electrode tabs 26 protrude horizontally from the electrode body 10, and the side surfaces 22 of the positive electrode tabs 21 or the side surfaces 27 of the negative electrode tabs 26 face upward.

Figure 8:
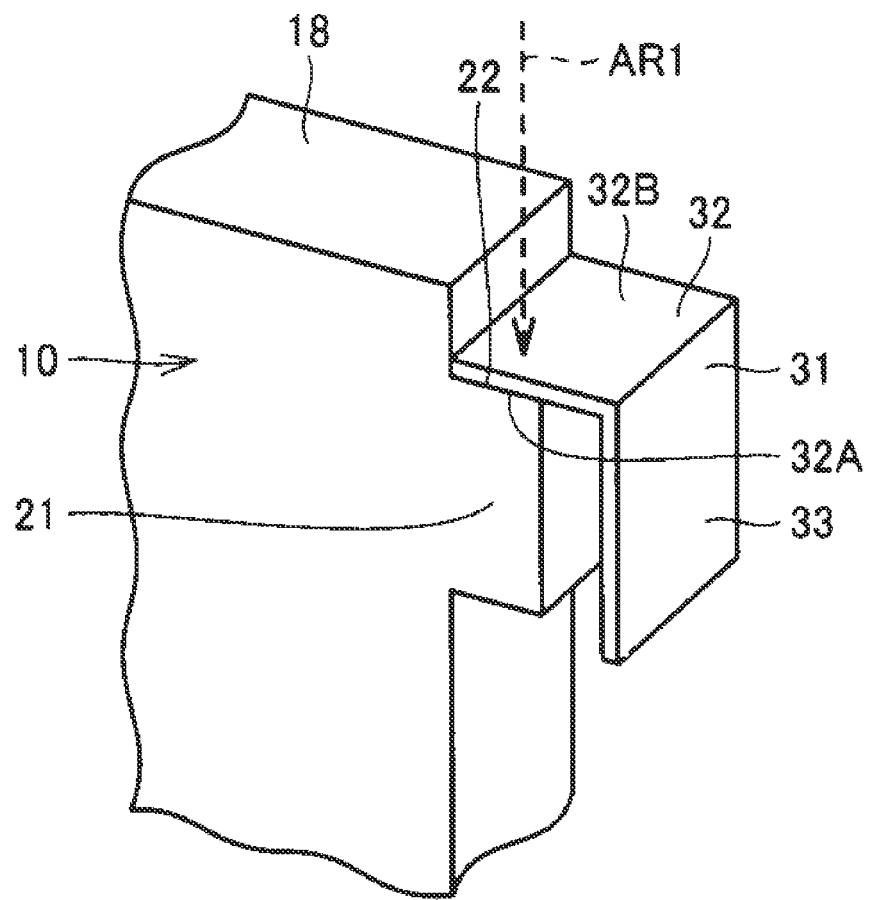
FIG. 8 is a perspective view showing an outline of a process of welding the current collecting terminal to the tab portions.

Then, at step S50, the current collecting terminals 30 are welded to the side surfaces 22 and 27 of the tab portions 20 of the electrode body 10. FIG. 8 is a perspective view showing an outline of a process of welding the current collecting terminal 30 to the tab portions 20. In FIG. 8, the positive electrode tabs 21 of the tab portions 20 and the positive electrode current collecting terminal 31 of the current collecting terminals 30 are shown. The positive electrode current collecting terminal 31 has a current collecting connection portion 32 and a terminal connection portion 33 which are the same as those of the negative electrode current collecting terminal 36 described above with reference to FIG. 6. The current collecting connection portion 32 has a first surface 32A facing the positive electrode tabs 21 and a second surface 32B on the opposite side of the first surface 32A. The positive electrode terminal 41 shown in FIG. 1 is electrically connected to the terminal connection portion 33.

The electrode body 10 is disposed such that the first side end portion 18 faces upward. Accordingly, the side surfaces 22 of the positive electrode tabs 21 face upward. An irradiation direction AR1 of a high-energy beam to the current collecting connection portion 32, shown in FIG. 8, faces downward. By irradiating the high-energy beam to the second surface 32B of the current collecting connection portion 32 from above, the first surface 32A of the current collecting connection portion 32 and the side surfaces 22 of the positive electrode tabs 21 are welded together, so that the current collecting connection portion 32 is fixed to the positive electrode tabs 21.

Then, the external terminals 40 are joined to the terminal connection portions of the current collecting terminals 30, so that the electrode body 10, the current collecting terminals 30 welded to the tab portions 20, the external terminals 40, and the lid 4 are formed as an integral structure. Referring back to FIG. 7, then, at step S60, this integral structure is housed in the case body 3. Then, by welding the lid 4 to the case body 3, the opening 9 of the case body 3 is closed. After joining the lid 4 to the case body 3, at step S70, an electrolyte solution is poured into the case body 3 through a pouring hole (not shown) provided in the lid 4. The electrode body 10 is impregnated with the electrolyte solution. Thereafter, the pouring hole is plugged to seal the case 2. In this way, the electric power storage device 1 of the first embodiment is manufactured.

As described above, in the electric power storage device 1 according to this embodiment, as shown in FIGS. 1 and 6, the current collecting terminals 30 are welded to the side surfaces 22 and 27, not facing the electrode body 10, of the tab portions 20 protruding from parts of the electrode body 10. Since the tab portions 20 and each current collecting terminal 30 are electrically connected together without foil-collecting the tab portions 20, bent portions for foil-collecting the tab portions are not required. Since a space for disposing the bent portions is not required in the case 2, it is possible to decrease in the case 2 a space that does not contribute to the battery capacity. Therefore, it is possible to suppress a decrease in battery capacity.

When welding the current collecting terminal 30 to the tab portions 20, a high-energy beam is irradiated in the irradiation direction AR1 indicated in FIG. 6. Since there is no possibility that the high-energy beam impinges on the electrode body 10, it is possible to provide the electric power storage device 1 with high reliability excellent in welding quality.

As shown in FIG. 2, the tab portions 20 are disposed further away from the side wall 5 of the case body 3 than the side end portion 17, facing the side wall 5, of the electrode body 10 is. The current collecting terminal 30 welded to the side surfaces 22 or 27 of the tab portions 20 is disposed between the side surfaces 22 or 27 of the tab portions 20 and the side wall 5 of the case body 3. By disposing the tab portions 20 further away from the side wall 5 than the side end portion 17, the current collecting terminal 30 can be disposed between the side surfaces 22 or 27 of the tab portions 20 and the side end portion 17 of the electrode body 10 in the width direction DR2. Since a space in which only the current collecting terminal 30 is disposed does not exist in the width direction DR2, it is possible to decrease in the case 2 a space that does not contribute to the battery capacity, so that it is possible to suppress a decrease in battery capacity.

As shown in FIG. 6, the tab portions 20 are arranged at an interval in the thickness direction. Even with the configuration in which the tab portions 20 are spaced apart from each other, the tab portions 20 and the current collecting terminal 30 can be electrically connected to each other by welding the current collecting terminal 30 to the side surfaces 22 or 27 of the tab portions 20.

As shown in FIG. 6, adjacent two of the tab portions 20 are electrically connected to each other only via the current collecting terminal 30. Even if not employing a configuration in which adjacent two of the tab portions 20 are brought into contact with each other to foil-collect the tab portions 20, the tab portions 20 and the current collecting terminal 30 can be electrically connected to each other by welding the current collecting terminal 30 to the side surfaces 22 or 27 of the tab portions 20.

As shown in FIG. 4, the electrode body 10 includes the positive electrode plates 11 and the negative electrode plates 12 and has the stacked structure in which the positive electrode plates 11 and the negative electrode plates 12 are stacked together. Accordingly, it is possible to suppress a decrease in battery capacity in the electric power storage device 1 including the electrode body 10 that is formed by stacking the positive electrode plates 11 and the negative electrode plates 12 together.

As shown in FIG. 4, the stacked structure of the electrode body 10 is formed by alternately stacking the positive electrode plates 11 and the negative electrode plates 12. Accordingly, it is possible to suppress a decrease in battery capacity in the electric power storage device 1 including the stacked electrode body 10 that is formed by alternately stacking the positive electrode plates 11 and the negative electrode plates 12.

As shown in FIGS. 1 and 4, the positive electrode tabs 21 each protruding from part of the positive electrode plate 11 and the negative electrode tabs 26 each protruding from part of the negative electrode plate 12 are arranged in the stacking direction of the positive electrode plates 11 and the negative electrode plates 12. As shown in FIG. 1, the current collecting terminals 30 include the positive electrode current collecting terminal 31 welded to the side surfaces 22 of the positive electrode tabs 21 and the negative electrode current collecting terminal 36 welded to the side surfaces 27 of the negative electrode tabs 26. Accordingly, since the side surfaces 22 of the positive electrode tabs 21 and the positive electrode current collecting terminal 31 are electrically connected to each other and since the side surfaces 27 of the negative electrode tabs 26 and the negative electrode current collecting terminal 36 are electrically connected to each other, neither the positive electrode tabs 21 nor the negative electrode tabs 26 need to be foil-collected. Therefore, it is possible to decrease in the case 2 a space that does not contribute to the battery capacity, so that it is possible to suppress a decrease in battery capacity.

As shown in FIG. 1, the side surfaces 22 of the positive electrode tabs 21, to which the positive electrode current collecting terminal 31 is welded, face the first side wall 6 of the case body 3, and the side surfaces 27 of the negative electrode tabs 26, to which the negative electrode current collecting terminal 36 is welded, face the second side wall 7 of the case body 3. Of the side surfaces 22 and 23 of the positive electrode tabs 21, the positive electrode current collecting terminal 31 is welded not to the side surfaces 23 facing the negative electrode tabs 26, but to the side surfaces 22 on the opposite side, and therefore, a high-energy beam can be easily irradiated to the positive electrode current collecting terminal 31, so that work to weld the positive electrode current collecting terminal 31 to the side surfaces 22 is facilitated. Of the side surfaces 27 and 28 of the negative electrode tabs 26, the negative electrode current collecting terminal 36 is welded not to the side surfaces 28 facing the positive electrode tabs 21, but to the side surfaces 27 on the opposite side, and therefore, a high-energy beam can be easily irradiated to the negative electrode current collecting terminal 36, so that work to weld the negative electrode current collecting terminal 36 to the side surfaces 27 is facilitated.

As shown in FIG. 7, the method of manufacturing the electric power storage device 1 according to this embodiment includes the step S50 of welding the current collecting terminals 30 to the tab portions 20. At the welding step S50, the current collecting terminals 30 are welded to the side surfaces 22 and 27, not facing the electrode body 10, of the tab portions 20. Since the tab portions 20 and each current collecting terminal 30 are electrically connected together without foil-collecting the tab portions 20, bent portions for foil-collecting the tab portions are not required. Since a space for disposing the bent portions is not required in the case 2, it is possible to decrease in the case 2 a space that does not contribute to the battery capacity. Therefore, it is possible to suppress a decrease in battery capacity. Further, since the welding is applied to the side surfaces 22 and 27 of the tab portions 20, even if a beam failure occurs during the welding, it is possible to prevent damage to the electrode body 10.

As shown in FIG. 8, at the welding step S50, the electrode body 10 is held such that the tab portions 20 protrude horizontally from the electrode body 10. Consequently, there is no possibility that, during welding between the current collecting terminal 30 and the tab portions 20, spatter enters the electrode body 10 in which the active materials are coated. Therefore, it is possible to provide the electric power storage device 1 with high reliability excellent in welding quality.

Second Embodiment

Figure 9:
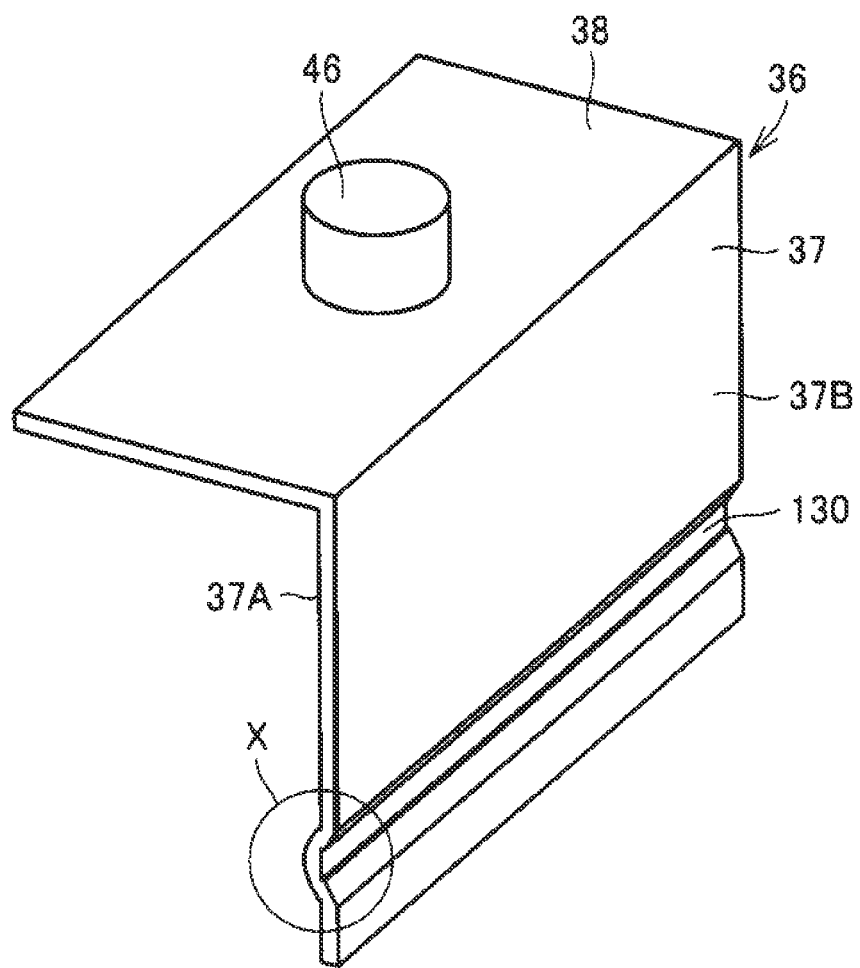
FIG. 9 is a perspective view of a current collecting terminal according to a second embodiment.

FIG. 9 is a perspective view of a negative electrode current collecting terminal 36 of an electric power storage device 1 according to a second embodiment. A current collecting connection portion of a current collecting terminal 30 of the second embodiment has a first surface facing tab portions 20 and a second surface on the opposite side of the first surface. The second surface is formed with a recessed portion extending linearly in a thickness direction of the tab portions 20. Since the negative electrode current collecting terminal 36 and a positive electrode current collecting terminal 31 of the second embodiment have mirror-symmetrical shapes, the following description will be focused on the negative electrode current collecting terminal 36, and no description will be given of the positive electrode current collecting terminal 31.

As shown in FIG. 9, the negative electrode current collecting terminal 36 has a current collecting connection portion 37, and the current collecting connection portion 37 has a first surface 37A and a second surface 37B. The current collecting connection portion 37 is formed with a welding protruding portion 130 by press working or the like. The welding protruding portion 130 has a shape extending linearly and protruding from the second surface 37B side toward the first surface 37A side. In the welding protruding portion 130, the first surface 37A has a shape protruding linearly, while the second surface 37B has a shape recessed linearly.

Figure 10:
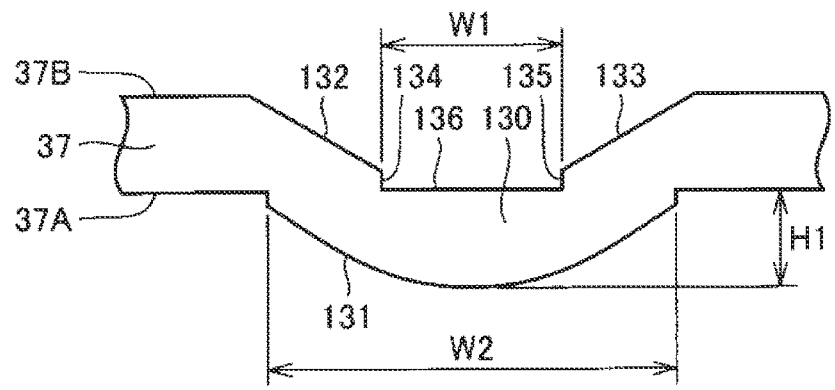
FIG. 10 is a partial enlarged view of the current collecting terminal showing a portion around a region X shown in FIG. 9.

FIG. 10 is a partial enlarged view of the current collecting connection portion 37 of the negative electrode current collecting terminal 36 showing a portion around a region X shown in FIG. 9. As shown in FIG. 10, when the welding protruding portion 130 is viewed in its extending direction, the welding protruding portion 130 has a first region 131 on the first surface 37A side and a second region 136 on the second surface 37B side. In a state before welding, the first region 131 has a curved-surface shape, while the second region 136 has a flat-surface shape. Through a welding step (step S50 shown in FIG. 7), these regions are deformed. In a state after the welding, the first region 131 may have a shape other than a perfect curved-surface shape, while the second region 136 may have a shape other than a perfect flat-surface shape.

The second surface 37B of the current collecting connection portion 37 has flat-surface regions extending in parallel to flat-surface portions of the first surface 37A. In the welding protruding portion 130, the second surface 37B has the second region 136, a pair of inclined surfaces 132 and 133, and a pair of stepped portions 134 and 135. The inclined surfaces 132 and 133 each have a shape continuous from the flat-surface region and inclined toward the side where the second region 136 is located. The stepped portion 134 has a shape continuous from the inclined surface 132 and extending toward the first surface 37A. The stepped portion 135 has a shape continuous from the inclined surface 133 and extending toward the first surface 37A.

In the second surface 37B, the flat-surface regions and the second region 136 are continuous with each other via the inclined surfaces 132 and 133 and the stepped portions 134 and 135. The inclined surfaces 132 and 133 and the second region 136 are continuous with each other via the stepped portions 134 and 135. A width W1 shown in FIG. 10 indicates a dimension of the second region 136 in a protruding direction DR1 which is a left-right direction in FIG. 10. A width W2 indicates a dimension of the first region 131 in the protruding direction DR1. A height H1 indicates a dimension of the welding protruding portion 130 protruding from the flat-surface portions of the first surface 37A.

Figure 11:
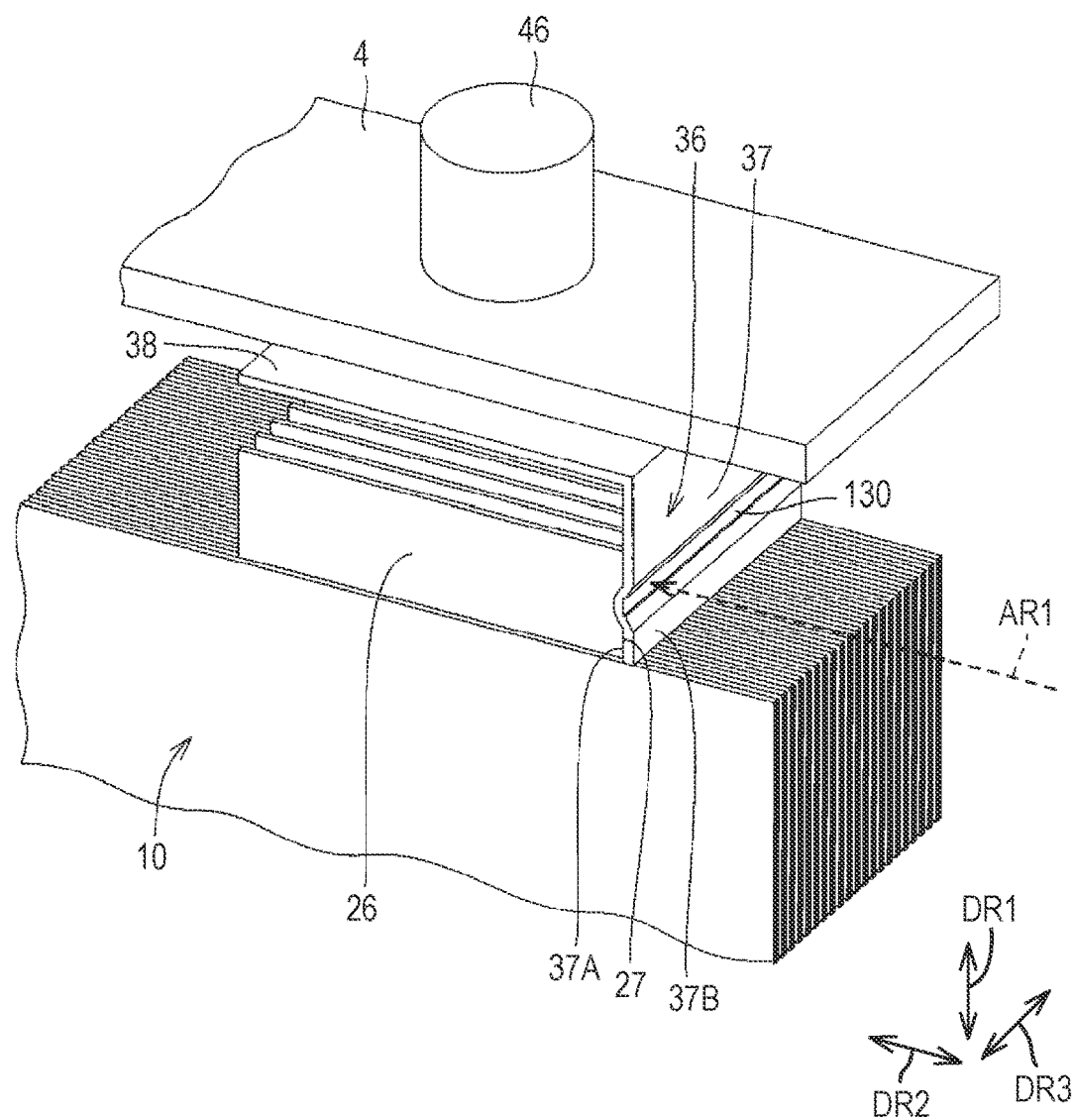
FIG. 11 is a perspective view showing, on an enlarged scale, a portion around negative electrode tabs of an electric power storage device according to the second embodiment.
Figure 12:
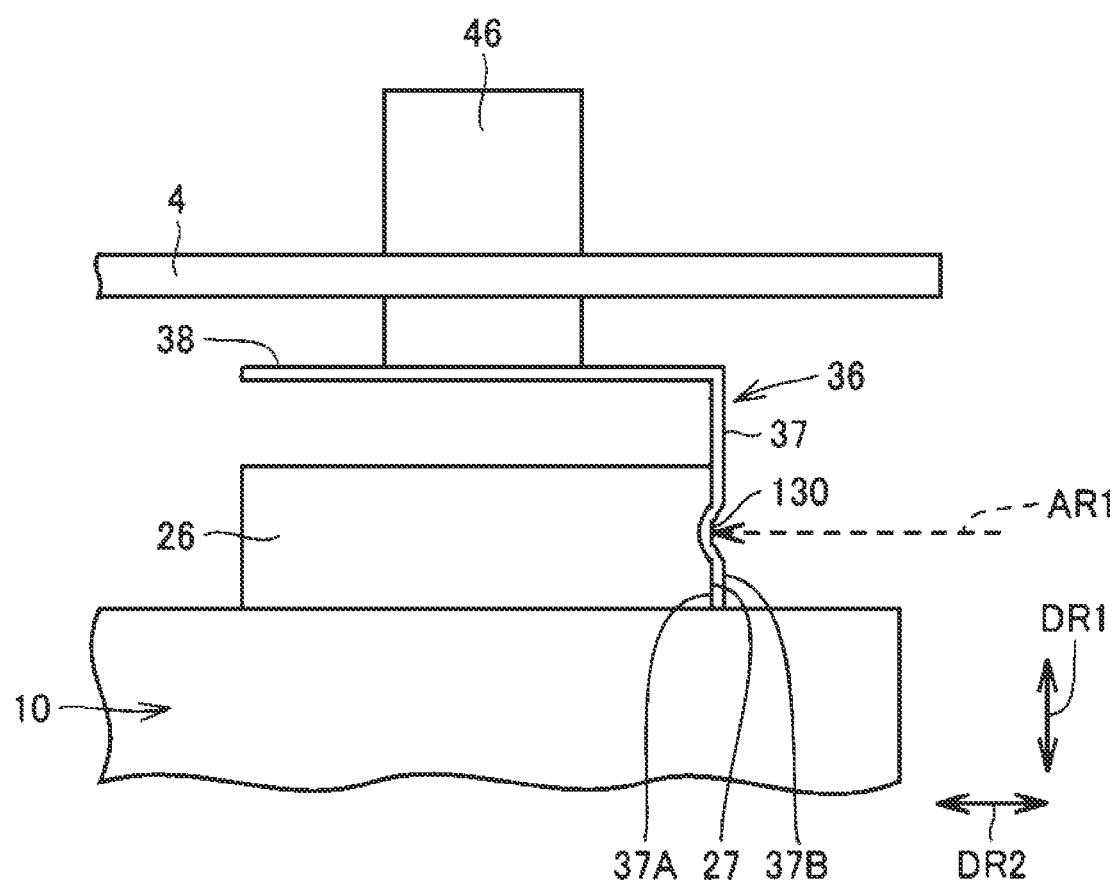
FIG. 12 is a front view showing, on an enlarged scale, the portion around the negative electrode tabs of the electric power storage device according to the second embodiment.

FIG. 11 is a perspective view showing, on an enlarged scale, a portion around negative electrode tabs 26 of the electric power storage device 1 according to the second embodiment. FIG. 12 is a front view showing, on an enlarged scale, the portion around the negative electrode tabs 26 of the electric power storage device 1 according to the second embodiment. Like in the first embodiment, an irradiation direction AR1 indicated by a broken line arrow in FIGS. 11 and 12 is a direction in which a high-energy beam such as a laser beam is irradiated to the current collecting connection portion 37. The welding protruding portion 130 extends linearly in a stacking direction DR3. The linear protruding shape on the first surface 37A side of the welding protruding portion 130 is pressed against side surfaces 27 of the negative electrode tabs 26, and a high-energy beam is irradiated to the linear recessed shape on the second surface 37B side of the welding protruding portion 130, so that the first surface 37A of the current collecting connection portion 37 is welded to the side surfaces 27 of the negative electrode tabs 26.

According to the electric power storage device 1 of the second embodiment described above, since the current collecting connection portion is formed with the welding protruding portion 130, when welding the current collecting terminal 30 to the tab portions 20, a leading end portion of the welding protruding portion 130 can be easily brought into contact with the side surfaces of the tab portions 20. Since the second region on the second surface side of the welding protruding portion 130 has the flat-surface shape, the tolerance for positional deviation of an irradiation position of a high-energy beam can be set large, and it is also possible to suppress variation in irradiation height (i.e., energy applied to the welding protruding portion 130) when scanning a high-energy beam. Since the second region 136 has the flat-surface shape, heat can easily escape when a high-energy beam is irradiated to the welding protruding portion 130. It is possible to suppress that the temperature of the leading end of the welding protruding portion 130 becomes higher than a required temperature, and thus it is also possible to suppress that a high-energy beam passes through the current collecting connection portion 37.

Therefore, the current collecting terminal 30 can be joined to the tab portions 20 with sufficient joining strength.

Third Embodiment

Figure 13:
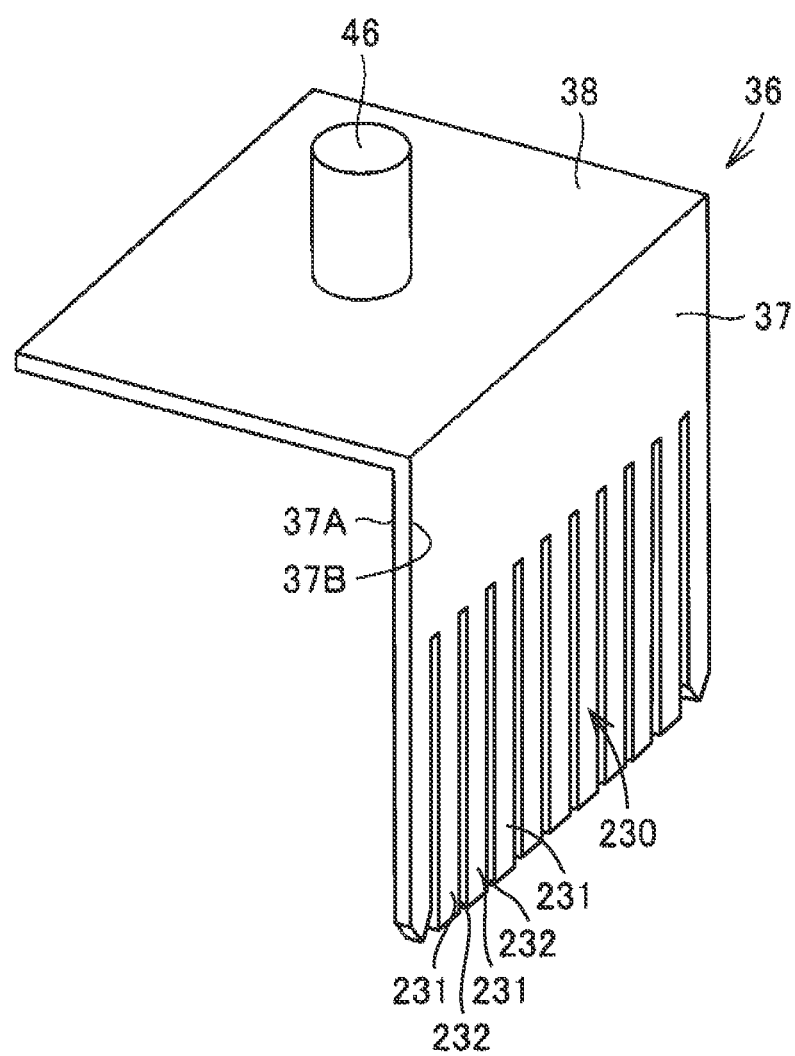
FIG. 13 is a perspective view of a current collecting terminal according to a third embodiment.

FIG. 13 is a perspective view of a negative electrode current collecting terminal 36 of an electric power storage device 1 according to a third embodiment. A current collecting connection portion of a current collecting terminal 30 of the third embodiment has a comb-like structure 230. Since the negative electrode current collecting terminal 36 and a positive electrode current collecting terminal 31 of the third embodiment have mirror-symmetrical shapes, the following description will be focused on the negative electrode current collecting terminal 36, and no description will be given of the positive electrode current collecting terminal 31.

As shown in FIG. 13, the negative electrode current collecting terminal 36 has a current collecting connection portion 37, and the current collecting connection portion 37 has the comb-like structure 230. The comb-like structure 230 has a plurality of tooth portions 231 arranged in parallel to each other. Gap portions 232 are each formed between adjacent two of the tooth portions 231.

Figure 14:
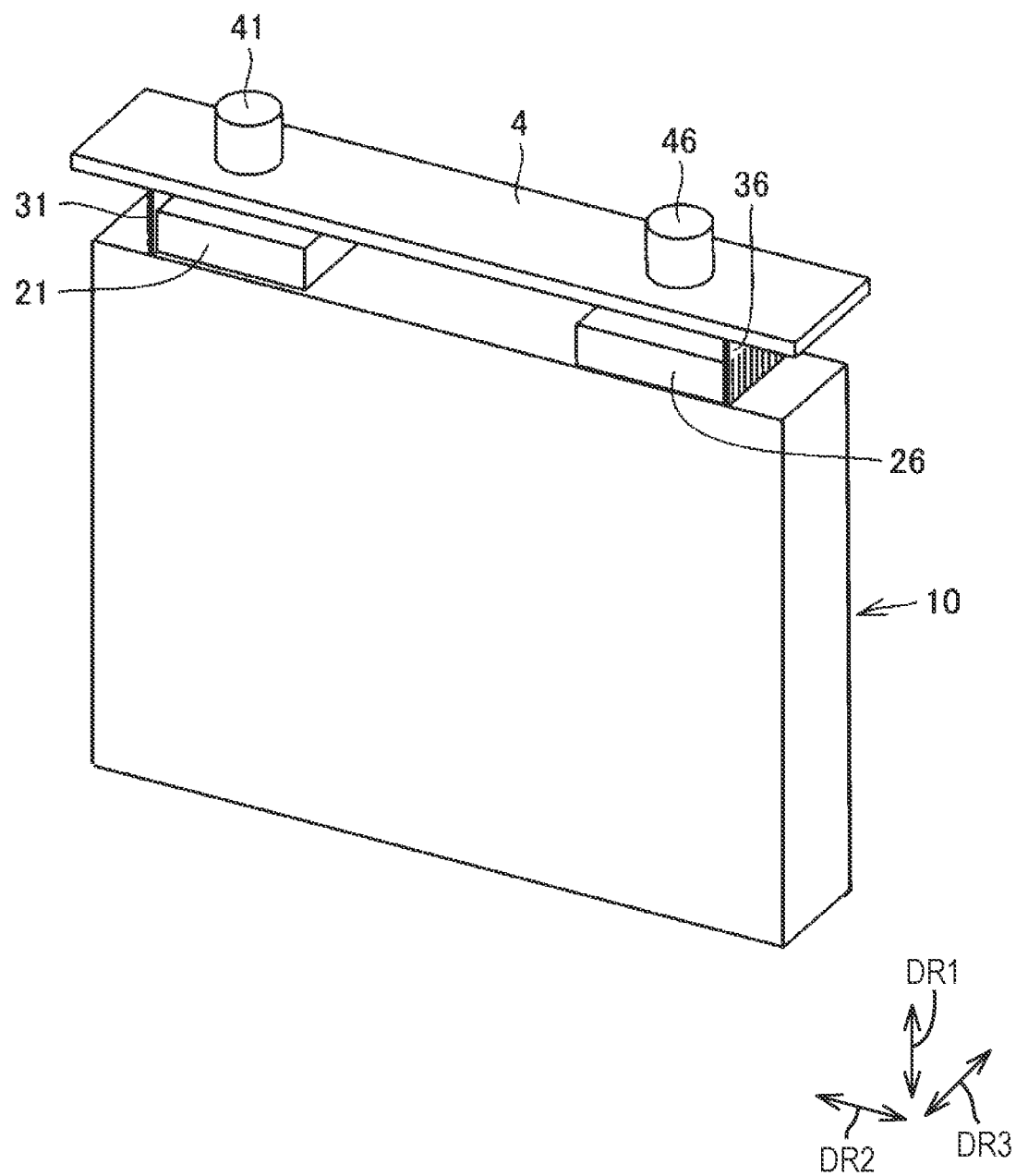
FIG. 14 is a perspective view of a state in which current collecting terminals are fixed to tab portions and further a lid is attached according to the third embodiment.
Figure 15:
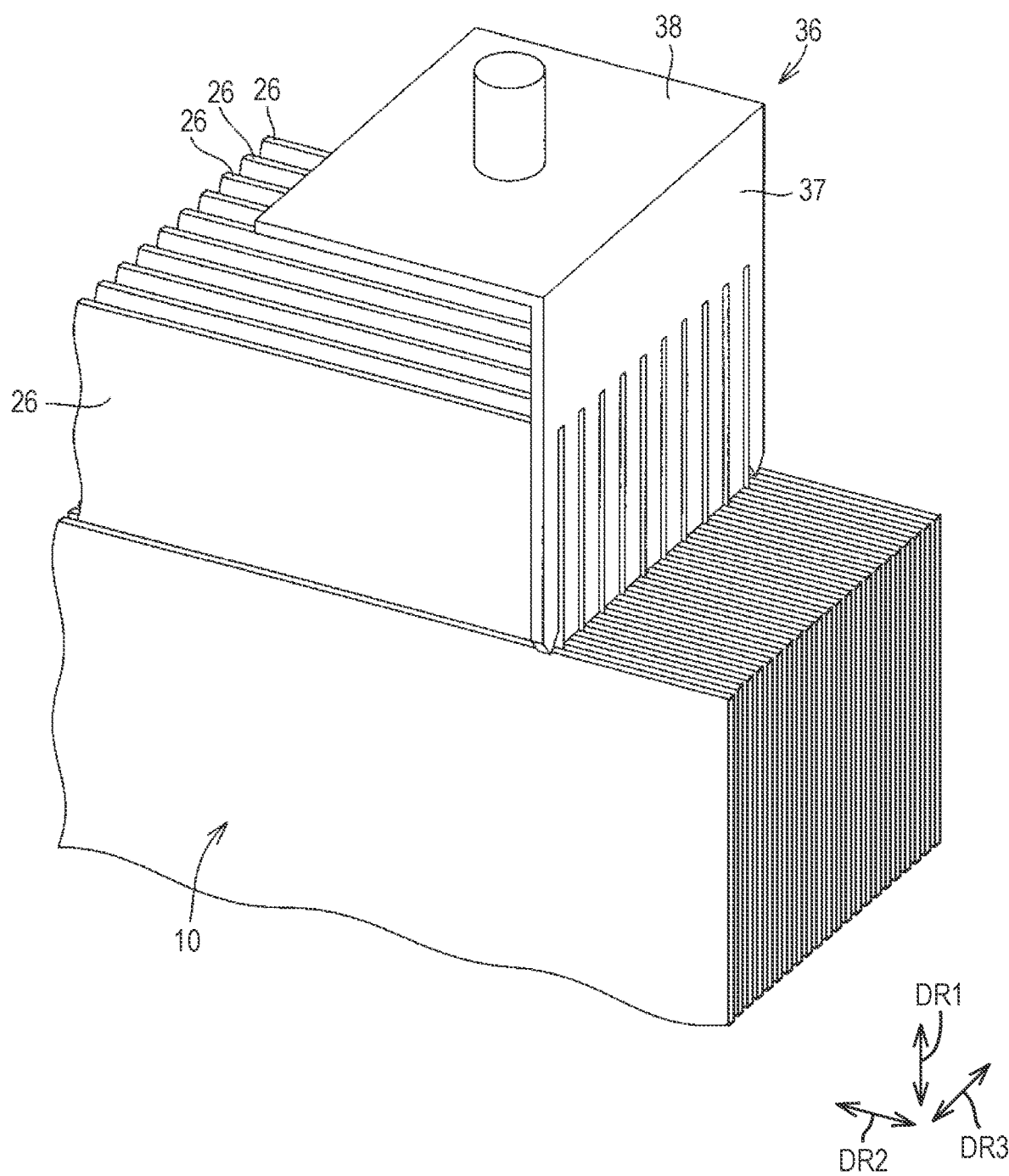
FIG. 15 is a perspective view showing, on an enlarged scale, a portion around negative electrode tabs of an electric power storage device according to the third embodiment.

FIG. 14 is a perspective view of a state in which the current collecting terminals 30 are fixed to tab portions 20 and further a lid 4 is attached according to the third embodiment. FIG. 15 is a perspective view showing, on an enlarged scale, a portion around negative electrode tabs 26 of the electric power storage device 1 according to the third embodiment.

As shown in FIGS. 14 and 15, the negative electrode current collecting terminal 36 of the third embodiment is attached to the negative electrode tabs 26 such that the tooth portions 231 of the comb-like structure 230 are inserted between side surfaces 27 of the negative electrode tabs 26. The negative electrode tabs 26 are respectively inserted into the gap portions 232 of the comb-like structure 230, so that the side surfaces 27 of the negative electrode tabs 26 are exposed from the gap portions 232. A high-energy beam is irradiated, in an irradiation direction AR1 like in the first and second embodiments, to the exposed side surfaces 27 of the negative electrode tabs 26 and the tooth portions 231 of the comb-like structure 230, thereby welding the negative electrode current collecting terminal 36 and the negative electrode tabs 26 together.

According to the electric power storage device 1 of the third embodiment described above, since the negative electrode current collecting terminal 36 and the negative electrode tabs 26 are welded together in the state where the side surfaces 27 of the negative electrode tabs 26 are exposed at the surface of the negative electrode current collecting terminal 36, it is possible to easily confirm the quality of the welding from the outside and thus it is possible to improve the reliability of the welding. Further, since a high-energy beam does not reach the inside of an electrode body 10 during the welding, it is possible to further improve the reliability of the electric power storage device 1.

Hereinbelow, an Example will be described. As electric power storage devices according to an Example and Comparative Examples, rectangular non-electrolyte batteries were manufactured, and an evaluation of the initial battery capacity by charging and discharging and an evaluation of the battery voltage failure after a charge/discharge test were performed for these batteries.

An electrode body of an electric power storage device of Example 1 was configured as described in the first embodiment. A base member of a positive electrode plate 11 was an aluminum foil or an aluminum alloy foil and had a thickness of 15 m. A base member of a negative electrode plate 12 was a copper foil and had a thickness of 10 m. The dimension in the width direction DR2 of the positive electrode plate 11 was set to 128 mm, and the dimension in the protruding direction DR1 of the positive electrode plate 11 was set to 78 mm. The dimension in the protruding direction DR1 of a positive electrode tab 21 protruding from the positive electrode plate 11 was set to 10 mm. The dimension in the width direction DR2 of the negative electrode plate 12 was set to 132 mm, and the dimension in the protruding direction DR1 of the negative electrode plate 12 was set to 82 mm. The dimension in the protruding direction DR1 of a negative electrode tab 26 protruding from the negative electrode plate 12 was set to 10 mm.

For a separator 14 interposed between the positive electrode plate 11 and the negative electrode plate 12, the dimension in the width direction DR2 was set to 136 mm, and the dimension in the protruding direction DR1 was set to 86 mm.

Current collecting terminals 30 were configured as described in the second embodiment. A positive electrode current collecting terminal 31 was manufactured by pressing an aluminum plate having a thickness of 0.6 mm and a width of 24 mm. A negative electrode current collecting terminal 36 was manufactured by pressing a copper plate having a thickness of 0.5 mm and a width of 24 mm. For a welding protruding portion 130, the width W1 shown in FIG. 10 was set to 1.3 mm, the width W2 to 2 mm, and the height H1 to 0.5 mm.

A first region 131 of the welding protruding portion 130 of the positive electrode current collecting terminal 31 was pressed against side surfaces 22 of the positive electrode tabs 21, and then fiber laser light was irradiated to a second region 136 of the welding protruding portion 130, thereby welding the positive electrode current collecting terminal 31 to the positive electrode tabs 21. The output of the fiber laser light was set to 1800 W. The speed of scanning the fiber laser light was set to 80 mm/sec.

A first region 131 of the welding protruding portion 130 of the negative electrode current collecting terminal 36 was pressed against side surfaces 27 of the negative electrode tabs 26, and then fiber laser light was irradiated to a second region 136 of the welding protruding portion 130, thereby welding the negative electrode current collecting terminal 36 to the negative electrode tabs 26. The output of the fiber laser light was set to 2800 W. The speed of scanning the fiber laser light was set to 80 mm/sec.

Then, the positive electrode current collecting terminal 31 and the negative electrode current collecting terminal 36 were respectively connected to external terminals 40 through holes formed in an aluminum lid 4. An electrode body 10 integrated with the external terminals 40 was placed in a case body 3, and then the lid 4 and the case body 3 were welded together. After pouring an electrolyte solution through a pouring hole provided in the lid 4, the pouring hole was plugged. In this way, an electric power storage device 1 of Example 1 was manufactured.

An electric power storage device of Comparative Example 1 was configured such that exposed current collecting core members were formed at both end portions of a wound electrode body as described in Japanese Patent Application Publication No. 2006-236790 (JP 2006-236790 A). After inserting a current collecting terminal into a center hole of the wound electrode body, an outer peripheral surface of the positive electrode core member or the negative electrode core member was pressed from both sides in a pressing direction of the electrode body, thereby causing an inner peripheral surface of the positive electrode core member or the negative electrode core member to abut under pressure against both side surfaces of a core member connection portion of a current collecting member. In this state, ultrasonic welding was applied from the outer peripheral surface side of the core member, thereby simultaneously joining one of the side surfaces of the core member connection portion and an inner peripheral surface of one of core member bundle portions, facing the one of the side surfaces of the core member connection portion, to each other, and joining the other side surface of the core member connection portion and an inner peripheral surface of the other core member bundle portion, facing the other side surface of the core member connection portion, to each other.

An electric power storage device of Comparative Example 2 was configured such that exposed current collecting core members were formed at both end portions of a wound electrode body as described in Japanese Patent Application Publication No. 2010-257945 (JP 2010-257945 A). Laser welding was applied in a state where a projection, protruding toward the electrode body, of a current collecting terminal was in close contact with a bent portion, located at an upper end of a side end surface of the electrode body, of the current collecting core member.

An electric power storage device of Comparative Example 3 was configured such that exposed current collecting core members were formed at end portions of an electrode body and converged to slit portions of current collecting terminals as described in JP 2013-196959 A. Portions, extending upward of each current collecting terminal, of the current collecting core members converged to the slit portion of each current collecting terminal were bent and a second member was pressed against the bent portions, and then the current collecting core members and each current collecting terminal were joined together by resistance welding.

30 electric power storage devices were manufactured for each of Example 1 and Comparative Examples 1 to 3. For these electric power storage devices, an evaluation of the initial battery capacity by charging and discharging and an evaluation of the battery voltage failure after a charge/discharge test were performed.

Initial charging and discharging of the electric power storage devices of Example 1 and Comparative Examples 1 to 3 was performed in the following sequence. First, constant-current charging was performed at a charge rate of 1□5 C for 2 hours. Then, after pausing for 10 minutes, constant-current discharging was performed at a discharge rate of 1□5 C until reaching a battery voltage of 3.0V. Further, after pausing for 10 minutes, constant-current charging was performed at a charge rate of 1□3 C until reaching a battery voltage of 4.1V, and then, constant-voltage charging was performed until the charging current reached 2□100 C. Subsequently, after pausing for 10 minutes, constant-current discharging was performed at a discharge rate of 1 □3 C until reaching a battery voltage of 3.0V, and then, constant-voltage discharging was performed until the discharge current reached 2 □100 C. Further, after pausing for 10 minutes, constant-current charging was performed at a charge rate of 1□5 C until reaching a battery voltage of 4.1V.

The batteries subjected to such initial charging and discharging were placed in an environment of 45° C. for 24 hours, and a battery voltage (given by V1) after the lapse of 24 hours was measured. Thereafter, the batteries were placed in an environment of 25° C. for 4 days, and a battery voltage (given by V2) after the lapse of 4 days was measured. Then, it was determined whether or not a value of V1□V2×3σ was within a predetermined reference value range. When the value was out of the reference value range, the battery was determined to be a voltage failure.

FIG. 16 is a table showing the evaluation results about the battery capacity and the number of voltage failures for the electric power storage devices in Example 1 and Comparative Examples 1 to 3. As shown in FIG. 16, the electric power storage device 1 of Example 1 was greater in battery capacity than Comparative Examples 1 to 3 and was greater in battery capacity by 10☐ or more compared to Comparative Example 1. This is considered to be because the dimension in the protruding direction of the tab portion 20 protruding from the separator 14 was made small in the electric power storage device 1 of Example 1.

With respect to the number of voltage failures, the number of voltage failures of Comparative Example 2 was the greatest. On the other hand, in the electric power storage devices 1 of Example 1, no voltage failure occurred although the same laser welding was performed as in Comparative Example 2. By disassembling the electric power storage devices subjected to voltage failure in Comparative Example 2, it was made clear that spatter generated during laser welding between the current collecting terminal and the current collecting core member adhered to the electrode body. In the electric power storage devices 1 of Example 1, since the laser welding portions and the electrode body 10 were away from each other, there was no adhesion of spatter to the electrode body 10.

From the above, it was proved that the electric power storage device 1 according to Example 1 was large in battery capacity and free from voltage failure, and thus was excellent.

In the above embodiments, the description has been given of the example in which the positive electrode plates 11 and the negative electrode plates 12 are alternately stacked to form the stacked electrode body 10. The electrode body 10 may be a winding-type electrode body that is formed by cylindrically winding a positive electrode sheet and a negative electrode sheet stacked together with a separator interposed therebetween.

While the embodiments and Example have been described, the above disclosure is for illustrative purposes only and is not intended to limit the disclosure in any aspect. The technical scope of the disclosure is defined by the claims and intended to include all changes within the meaning and range of equivalents of the claims.

The electric power storage devices described in this specification are applicable to, for example, vehicles and various devices.

What is claimed is:

1. An electric power storage device comprising:
   a case body with an opening, the opening formed at an upper portion of the case body;
   an electrode body housed in the case body;
   a tab portion protruding in a protruding direction from part of the electrode body toward the opening and having a side surface not facing the electrode body; and
   a current collecting terminal welded to the side surface of the tab portion,
   wherein
   the electrode body includes a positive electrode and a negative electrode, and
   the electrode body has a stacked structure in which the positive electrode and the negative electrode are stacked together in a thickness direction of the tab portion,
   a plurality of tab portions are arranged at an interval in the thickness direction of the tab portion, and the side surface of each of the plurality of tab portions faces a direction perpendicular to the thickness direction and perpendicular to the protruding direction.

2. The electric power storage device according to claim 1, wherein
   the case body has a side wall,
   the electrode body has a side end portion facing the side wall, and
   the tab portion is disposed further away from the side wall than the side end portion is.

3. The electric power storage device according to claim 1, wherein adjacent two of the tab portions are electrically connected to each other only via the current collecting terminal that is welded to the side surface of each of the adjacent two tab portions.

4. The electric power storage device according to claim 1, wherein
   the stacked structure is configured such that a plurality of positive electrodes and a plurality of negative electrodes are alternately stacked.

5. The electric power storage device according to claim 4, wherein
   the tab portions include a plurality of positive electrode tabs each protruding from part of a corresponding one of the positive electrodes and a plurality of negative electrode tabs each protruding from part of a corresponding one of the negative electrodes,
   the plurality of positive electrode tabs are arranged in a stacking direction of the positive electrodes and the negative electrodes,
   the plurality of negative electrode tabs are arranged in the stacking direction of the positive electrodes and the negative electrodes, and
   the current collecting terminal includes a positive electrode current collecting terminal welded to side surfaces of the plurality of positive electrode tabs and a negative electrode current collecting terminal welded to side surfaces of the plurality of negative electrode tabs.

6. The electric power storage device according to claim 5, wherein
   the case body has a first side wall and a second side wall facing each other,
   the side surfaces of the positive electrode tabs to which the positive electrode current collecting terminal is welded face the first side wall, and
   the side surfaces of the negative electrode tabs to which the negative electrode current collecting terminal is welded face the second side wall.

* * * * *